Dec. 17, 1968   W. F. HILL   3,417,310
OSCILLATOR-CONTROLLED INDICATOR FOR BATTERY CHARGER SYSTEM
Filed Nov. 10, 1966
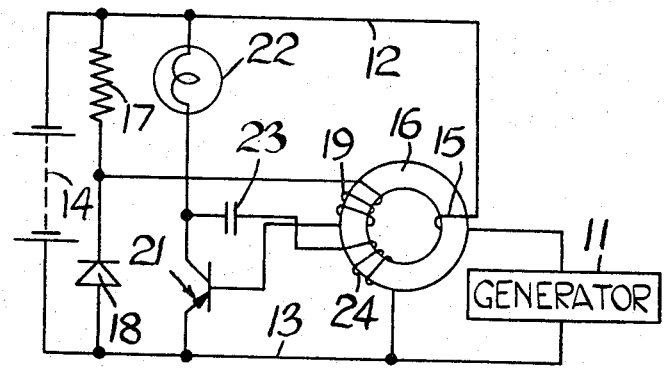

United States Patent Office 3,417,310
Patented Dec. 17, 1968

3,417,310
OSCILLATOR-CONTROLLED INDICATOR
FOR BATTERY CHARGER SYSTEM
William Frank Hill, Stafford, England, assignor to Joseph Lucas (Industries) Limited, Birmingham, England, a British company
Filed Nov. 10, 1966, Ser. No. 593,409
Claims priority, application Great Britain, Jan. 14, 1966, 1,830/66
2 Claims. (Cl. 320—48)

This invention relates to battery charging systems for use in road vehicles.

A battery charging system according to the invention comprises in combination a pair of terminals between which in use the battery of a vehicle is connected, a generator for providing power to said pair of terminals, a warning lamp connected in series with an oscillator between said pair of terminals, and magnetic means operated by the output current from the generator for preventing the oscillator from oscillating when the current flowing from the generator to the batery reaches a predetermined value, the arrangement being such that the lamp is illuminated until said predetermined value of current is reached.

The accompanying drawing is a circuit diagram illustrating one example of the invention.

Referring to the drawing the system includes a generator 11, which may be a dynamo and associated cutout or an alternator having a full wave rectifier associated therewith, and a battery 14 supplying power to supply lines 12, 13. The line 13 is connected to one output terminal of the generator, and the line 12 is connected to the other output terminal of the generator by way of a loop 15 on a core 16 of saturable magnetic material. This core may be of square loop material if desired.

Connected between the lines 12, 13 in series are a resistor 17 and a diode 18, a point intermediate which is connected by way of a winding 19 on the core 16 to the base of a p-n-p transistor 21, the emitter of which is connected to the line 13, and the collector of which is connected to the line 12 by way of a warning lamp 22. The collector of the transistor is further connected to the line 13 through a capacitor 23 in series with a winding 24 on the core 16.

When the ignition switch (not shown) of the vehicle is closed, the oscillator constituted by the transistor 21, diode 18, resistor 17, capacitor 23 and windings 19, 24 operates at a frequency which is sufficiently high to ensure that the lamp 22 appears to be illuminated continuously. This frequency will, where the generator is an alternator, be in excess of the alternator frequency. As the generator starts to charge the battery, the core 16 becomes magnetised by virtue of the loop 15 and as the flux in the core approaches saturation the amplitude of the oscillations, which is limited by the saturation of the core, is reduced, thus dimming the warning lamp 22. If the generator is a dynamo or an alternator with its output fully smoothed, the core approaches saturation steadily with increasing output current. If the generator is an alternator with unsmoothed output, the ripple will modulate the oscillation, and the average value of the oscillation will fall with increasing average value of output current to give the same result as a fully smoothed signal. When the generator output reaches a predetermined value, the core becomes saturated, so that there is no further coupling between the windings 19, 24. The lamp 22 is then extinguished.

Having thus described my invention what I claim as new and desire to secure by Letters Patent is:

1. A battery charging system for use in a road vehicle, comprising in combination a pair of terminals between which in use the battery of a vehicle is connected, a generator for providing power to said pair of terminals, a warning lamp connected in series with an oscillator between said pair of terminals, and magnetic means operated by the output current from the generator for preventing the oscillator from oscillating when the current flowing from the generator to the battery reaches a predetermined value, the arrangement being such that the lamp is illuminated until said predetermined value of curernt is reached.

2. A system as claimed in claim 1 in which the magnetic means includes a saturable core on which are wound a pair of windings forming part of the oscillator, the generator being connected to the battery by way of a loop on the core so that at said predetermined value the core becomes saturated to decouple said winding and stop the oscillator.

References Cited

UNITED STATES PATENTS

| 2,719,288 | 9/1955 | Young | 340—251 |
| 2,745,090 | 5/1956 | Grillo | 340—253 |
| 2,912,594 | 11/1959 | Raver | 320—48 X |
| 3,143,729 | 8/1964 | Power | 315—135 X |
| 3,173,073 | 3/1965 | Hetzler et al. | 320—48 |
| 3,231,811 | 1/1966 | Peras | 320—48 |
| 3,266,031 | 8/1966 | Sadler | 320—48 X |

LEE T. HIX, *Primary Examiner.*

S. WEINBERG, *Assistant Examiner.*

U.S. Cl. X.R.

315—129, 135, 200; 322—99; 331—64, 111; 340—248